(12) United States Patent
Demma

(10) Patent No.: US 8,371,637 B2
(45) Date of Patent: *Feb. 12, 2013

(54) MOTOR VEHICLE WITH PANORAMA SCREEN AND PULL-OUT ROLLER BLIND

(75) Inventor: Dino Demma, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/860,255

(22) Filed: Aug. 20, 2010

(65) Prior Publication Data

US 2011/0042016 A1 Feb. 24, 2011

(30) Foreign Application Priority Data

Aug. 20, 2009 (DE) .................... 10 2009 038 187

(51) Int. Cl.
*B60J 1/20* (2006.01)
(52) U.S. Cl. .................................... 296/97.8
(58) Field of Classification Search ............... 296/214, 296/97.8
See application file for complete search history.

(56) References Cited

U.S. PATENT DOCUMENTS

| 6,227,601 | B1 | 5/2001 | LaFrance | |
|---|---|---|---|---|
| 6,857,693 | B2 * | 2/2005 | Hattass et al. | 296/214 |
| 7,029,057 | B2 * | 4/2006 | Izabel et al. | 296/152 |
| 7,059,651 | B2 * | 6/2006 | Bohm et al. | 296/97.11 |
| 2002/0092630 | A1 | 7/2002 | Kremer et al. | |
| 2003/0006630 | A1 * | 1/2003 | Kralik et al. | 296/214 |

FOREIGN PATENT DOCUMENTS

| DE | 4424188 C1 | 12/1995 |
|---|---|---|
| DE | 19745866 C1 | 12/1998 |
| DE | 10101491 C1 | 5/2002 |
| DE | 10140412 C1 | 11/2002 |
| DE | 10245246 A1 | 4/2004 |
| DE | 202004001725 U1 | 6/2004 |
| DE | 10338722 A1 | 3/2005 |
| DE | 10360629 A1 | 7/2005 |
| DE | 202006011455 U1 | 12/2006 |
| DE | 102005032043 A1 | 1/2007 |
| DE | 60124162 T2 | 9/2007 |
| DE | 102008017197 A1 | 10/2009 |
| DE | 102008017198 A1 | 10/2009 |
| EP | 1398192 A2 | 3/2004 |
| GB | 2459359 A | 10/2009 |

OTHER PUBLICATIONS

German Patent Office, German Search Report for Application No. 102009038187.2, dated May 7, 2010.
UK IPO, British Search Report for Application No. 1013111.8, dated Nov. 3, 2010.

* cited by examiner

*Primary Examiner* — Joseph Pape
(74) *Attorney, Agent, or Firm* — Ingrassia Fisher & Lorenz, P.C.

(57) ABSTRACT

A motor vehicle is provided with a panorama screen, a pull-out roller blind, more preferably sun roller blind, for covering said screen and at least one support member for supporting the at least partially pulled-out roller blind against the screen. The support member relative to the pull-out roller blind is moveably guided on the screen.

18 Claims, 4 Drawing Sheets

MOTOR VEHICLE WITH PANORAMA SCREEN AND PULL-OUT ROLLER BLIND

CROSS-REFERENCE TO RELATED APPLICATION

This application claims priority to German Patent Application No. 102009038187.2, filed Aug. 20, 2009, which is incorporated herein by reference in its entirety.

TECHNICAL FIELD

The technical field relates to a motor vehicle with a transparent panorama screen and a pull-out roller blind for covering this screen.

BACKGROUND

A roller blind for a panorama screen is known for example from DE 102 45 246 A1. Panorama screen is the name given to front and windscreens as well as roof screens or glass roofs continuously more preferably unitarily joined with these. Such panorama screens impart a better field of vision and greater incidence of light.

Roller blinds for the at least partial covering of such panorama screens are correspondingly long. If such a roller blind is flexible, it can sag into the passenger compartment when fully pulled out for shading a parked vehicle.

U.S. Pat. No. 6,227,601 B1 proposes a lamellar cover for a conventional windscreen, whose stiff segments are guided in lateral guide rails. From DE 20 2006 011 455 U1 two separate roller blinds are known with severely crowned conventional windscreens in order to avoid excessive chording relative to the screen. DE 101 40 412 C1 and DE 10 2005 032 043 A1 show roller blinds for a conventional windscreen which is reinforced with bands running in pull-out direction.

DE 103 60 629 A1 proposes continuous stiff segments for panorama screens which are coupled with each other via compensating joints. Because of their inherent stability no substantial sagging occurs here. Own German patent applications DE 10 2008 01 7197.2 and DE 10 2008 01 7198.0 not pre-published propose to support a roller blind on the front edge of a headlining of a vehicle with conventional windscreen or on a separate inner screen below a panorama screen which serves as sun screen.

At least one object of the present invention is to improve a generic motor vehicle with a pull-out roller blind for covering a panorama screen. In addition, other objects, desirable features, and characteristics will become apparent from the subsequent summary and detailed description, and the appended claims, taken in conjunction with the accompanying drawings and this background.

SUMMARY

A motor vehicle according to an embodiment of the invention comprises a transparent panorama screen, more preferably of glass, wherein transparent more preferably also means at least partially tinted screens, which can be (further) darkened by means of a roller blind. Panorama screen here is the name given to a front or windscreen which runs more or less (also) vertically inclined and a roof screen or glass roof in the roof of the motor vehicle continuously more preferably unitarily connected with this, which roof for example preferentially runs substantially horizontally and extends from an A-pillar in the direction of a B-pillar, if applicable as far as the latter or beyond the latter, in a preferred embodiment as far as into the region of a C-pillar.

To cover this screen a pull-out roller blind is provided. In a preferred embodiment a roller blind cylinder of the roller blind is arranged in the region of a B-pillar of the motor vehicle or on its side facing away from the A-pillar further at the back in vehicle longitudinal direction where it is integrated in a roof headlining cover or accommodated behind a roof headlining cover. Here, a roller blind cylinder can comprise an integrated return spring.

According to an embodiment of the invention, one, two, three, four or more support members are moveably guided on the screen relative to the roller blind in order to support the roller blind in the direction against the screen. In this manner, sagging of a roller blind, more preferably of a flexible roller blind, into the passenger compartment can be limited or prevented. Preferentially, at least one support member is provided for supporting a horizontal roof region and at least one support member for supporting in an upper region of a frontal windscreen region or a transition region to the roof region, which makes possible tautening of the roller blind against the locking of its in pull-out direction front end.

Support members according to an embodiment of the invention, which consist of plastic, fiber composite material and/or metal and/or can have a circular, rectangular or oval cross section, are guided in a guiding device in a preferred embodiment. This guiding device can more preferably comprise one or a plurality of rails in which one or a plurality of support members are displaceably guided positively, for example in a sliding manner or via rolling bodies such as more preferably guide wheels. In the same or a separate guiding device the roller blind itself, more preferably a pull member connected with said roller blind in a fixed manner, can be guided, which can be arranged on the in pull-out direction front end of the roller blind.

In a preferred embodiment one or a plurality of support members can be or are coupled with the roller blind, more preferably by way of a drag mechanism in push-in and/or pull-out direction. This drag mechanism can for example comprise hooks and/or magnets.

Preferentially, such support members can be moved into the field of vision of the screen through pulling-out of the roller blind, preferentially offset relative to this pull-out movement, and support the roller blind there. In addition or alternatively, support members can be moved out of the primary field of vision of the screen by sliding in the roller blind, preferentially positively connected to the roller blind, so as not to impair the field of vision when not required.

The drag mechanism can be decouplable, so that a support member moved, more preferably dragged along by the pulled-out roller blind in a predetermined position is decoupled from said roller blind until on pushing-in of the roller blind it is again taken along by the latter. For decoupling, one or a plurality of impact blocks, magnets, couplings, cable guides or the like can be provided. More preferably, a plurality of predetermined decoupling positions can be provided for a plurality of support members of a roller blind. In a preferred embodiment at least one decoupling position is provided in the horizontal roof region of the panorama screen and/or at least one decoupling position in the transition region between roof and windscreen region. There, through support members positioned in the horizontal roof region sagging due to gravity of a roller blind running substantially horizontally under its own weight can be advantageously reduced, through a support member positioned in the transition region between roof and windscreen region the roller blind can be advantageously tautened between said support member and a locking device of its in pull-out direction front end, more preferably a pull member.

Similarly, one or a plurality of support members can be adjustable in a guide rail relative to the screen more preferably at least in pull-out direction even independently of the roller blind, manually or by motor, for example via at least one pull cable, push cable, gear and/or a moveable slide. Preferably, these are automatically adjusted in predetermined, positions preferentially dependent on the pull-out length of the roller blind.

Preferably a roller blind has a predetermined opacity, preferably at least 25% opacity, more preferably at least 50% opacity, preferentially substantially 100% opacity, wherein opacity can be defined for example as the quotient of the light intensity, measured for example in candela [cd], a luminance, measured for example in [cd/m$^2$], a luminous flux, measured for example in lumen, a quantity of light, measured for example in lux, behind the roller blind divided by the corresponding quantity in front of the roller blind.

In a preferred embodiment the length of one or a plurality of support members can be varied in extension or vehicle transverse direction. This can be realized for example through elastic deformation of the support member and/or through sliding parts of a multi-part support member, preferentially against an elastic preload which tends to reset said support member in a reference length. In this manner, the support members can also be guided on the screen in guide rails which are not parallel.

In order to prevent inadvertent excessive pulling-out of the roller blind while driving, a more preferably electrically, mechanically, pneumatically or hydraulically actuatable latch or stop can be provided which, with switched-on ignition, limits the roller blind travel and more preferably can be arranged in one or a plurality of guide rails of the roller blind.

In addition or alternatively a motor drive of the roller blind can be provided which can move the roller blind in a guide rail for example by way of at least one pull cable, push cable, gear and/or a moveable slide.

Such a drive can preferentially be suitably activated to limit the roller blind travel. To this end, suitable sensors or switches, for example inductive sensors, Hall sensors, optical sensors or the like can determine the position of the roller blind.

A drive can also move the roller blind independently into a shading position, for example when closing a vehicle locking device, in which it covers the screen as far as possible, or when opening the vehicle conversely into an anti-glare position, in which only a part of the screen is covered, a completely pushed-in position or a middle position, from which the driver can quickly move the roller blind into a desired position. In a preferred embodiment a corresponding drive control is coupled with a sensor, more preferably a photo, solar or temperature sensor and, based on signals from such sensor, predetermines a position of the sun roller blind, for example further covering with more intense solar radiation or higher vehicle interior temperature.

Especially if the roller blind extends preferentially continuously, substantially over the entire width of at least one screen to be covered, this can result in problems with an interior rear-view mirror on the roof headlining of the vehicle positioned in the pull-out path of the roller blind. In addition to a roller blind slit at least in regions a visual system with a camera and a monitor is conceivable as remedy to show an image of a rear space behind the motor vehicle captured by the camera. The camera is preferentially arranged in the rear region of the vehicle, preferably at the highest point of the rear, the monitor on or in the instrument panel of the vehicle. In a preferred embodiment the camera can be swiveled and can thus also advantageously serve as reverse parking aid. To this end, swiveling of the camera can more preferably be activated through the engaging of a reverse gear. In a preferred embodiment the camera is activated by the driver, for example via a switch on the steering wheel, it can also switch itself off again following a predetermined period of time. Preferentially, the camera captures substantially the entire 180° range behind the vehicle, which reduces blind spot regions. The monitor can be utilized to display additional information, in particular of a navigation system.

BRIEF DESCRIPTION OF THE DRAWINGS

The present invention will hereinafter be described in conjunction with the following drawing figures, wherein like numerals denote like elements, and:

FIG. 1 the front upper interior region of a motor vehicle according to an embodiment of the present invention in lateral section with sun roller blind pushed in;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
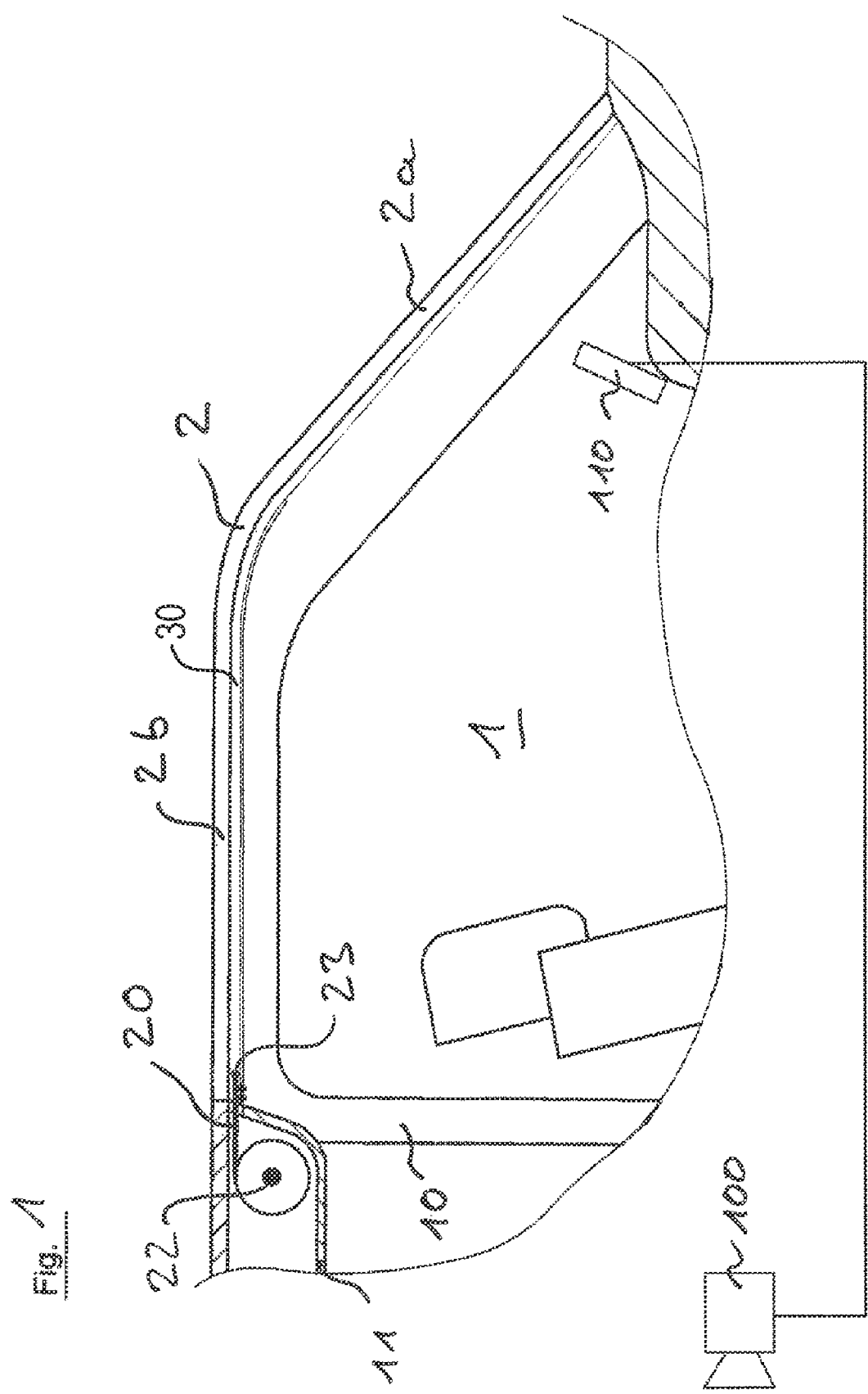

FIG. 1 shows in section from the side the front upper interior region of a motor vehicle 1 according to an embodiment of the present invention with a panorama screen 2. The latter comprises a front, vertically inclined windscreen region 2a, which merges with a horizontal roof region 2b in a rounded-off transition region.

For the at least partial covering of the roof region 2b (see FIG. 2) for anti-glare protection of the occupants while travelling through partial covering of the windscreen region 2a (see FIG. 3) and for the complete darkening also of the windscreen region 2a or shading of the vehicle interior space during vehicle stoppage (see FIG. 4) a continuous sun roller blind 20 with two freely moveable support members 21a, 21b (see FIGS. 2 to 4) is provided, which can be locked in the shown and additional (intermediate) positions, for example through clamping connection, through engagement or stoppage of a roller blind drive.

A roller blind cylinder 22 of the sun roller blind 20 is located under a roof headlining cover 11 in the region of the roof at the height of a B-pillar 10. The cylinder 22 like the unitary sun roller blind 20 is continuous in vehicle transverse direction (perpendicularly to the drawing plane of the Fig.).

In the in pull-out direction front part of the sun roller blind 20 a pull member 23 is arranged, which is connected with the flexible, for example textile roller blind material in a fixed manner and positively guided in guide rails 30 which are positioned laterally of the panorama screen 2.

Under the sun roller blind, i.e. closer to the vehicle interior, two support members 21a, 21b extend. The support members 21a, 21b with their two face ends are each positively guided in the guide rails 30, in which the pull member 23 is also guided. With said pull member, an in pull-out direction front support member 21a is releasably coupled via a drag mechanism in form of elastic hooks, which in turn is releasably coupled with an in pull-out direction rear support member 21b via a drag mechanism in form of a plurality of permanent magnet pairs. In addition, the rear support member 21b is tied to the cylinder 22 in the guide rails 30 with cable controls of predetermined pull-out length which are not shown.

Figure 2:
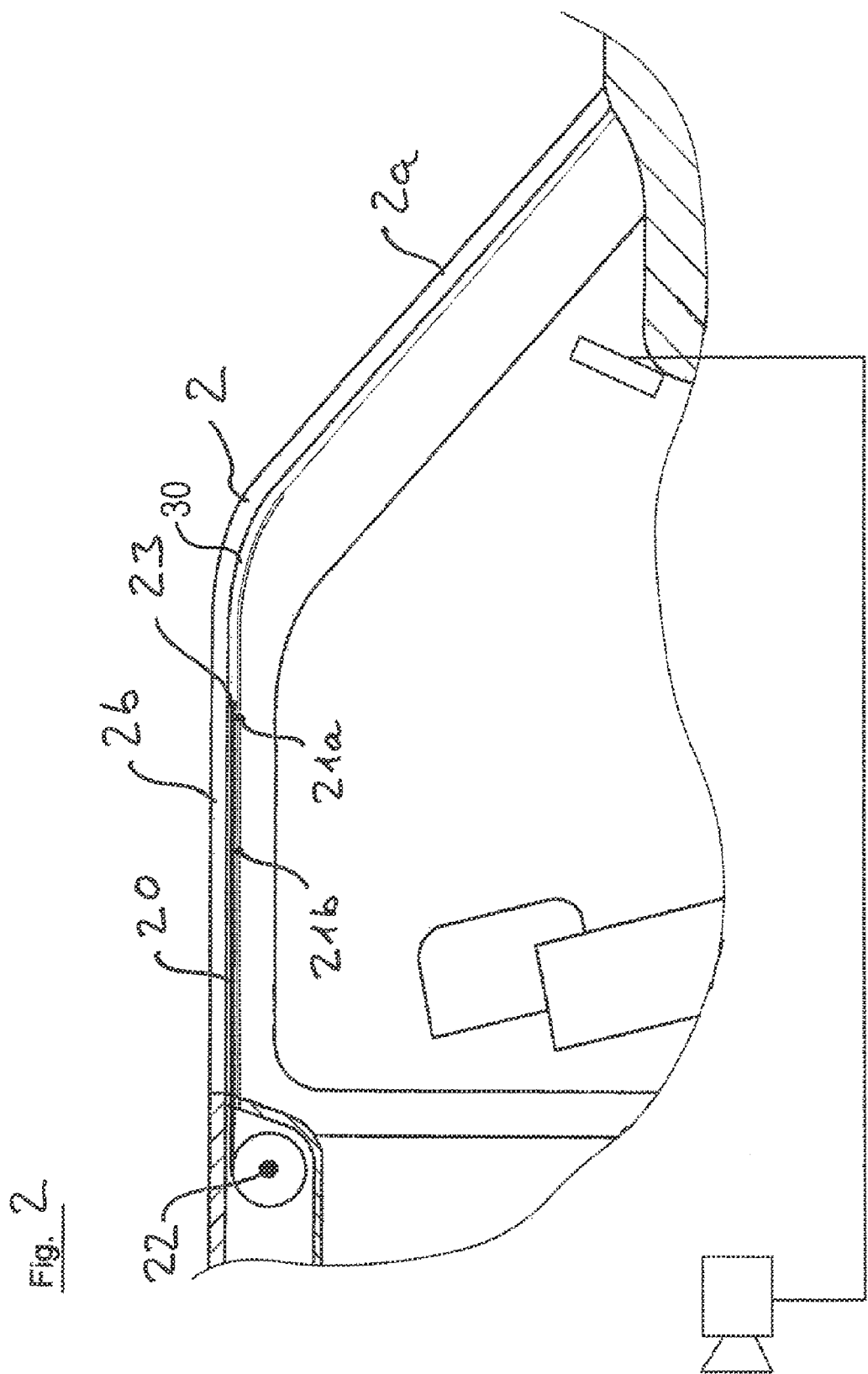
FIG. 2 the motor vehicle from FIG. 1 with sun roller blind partially pulled out into a roof covering position.

If the sun roller blind 20 (see FIG. 1) completely wound on to the roller blind cylinder 22 or pushed behind the roof headlining cover 11 because of an integrated return spring (not shown) is initially pulled out into a roof covering position shown in FIG. 2 manually or motorically via an actuator with cable control, push cable, gear or the like, the pull member 23 takes the coupled support members 21a, 21b along in the guide rails 30. Here, the cable controls, which tie the rear support member 21b to the cylinder 22, unwound in the process reach their predetermined pull-out length and prevent further movement of this support member 21b along with the pull member 23 and the front support member 21a. Accordingly, the hook connections are released under the elastic deformation of the hooks and the rear support member 21b decoupled from the front support member 21a remains in the position predetermined by the pull-out length of the cable controls (see FIG. 2), in which it tautens the sun roller blind 20 approximately in the middle of the roof region 2b against its inner side and limits or prevents sagging into the passenger interior.

Figure 3:
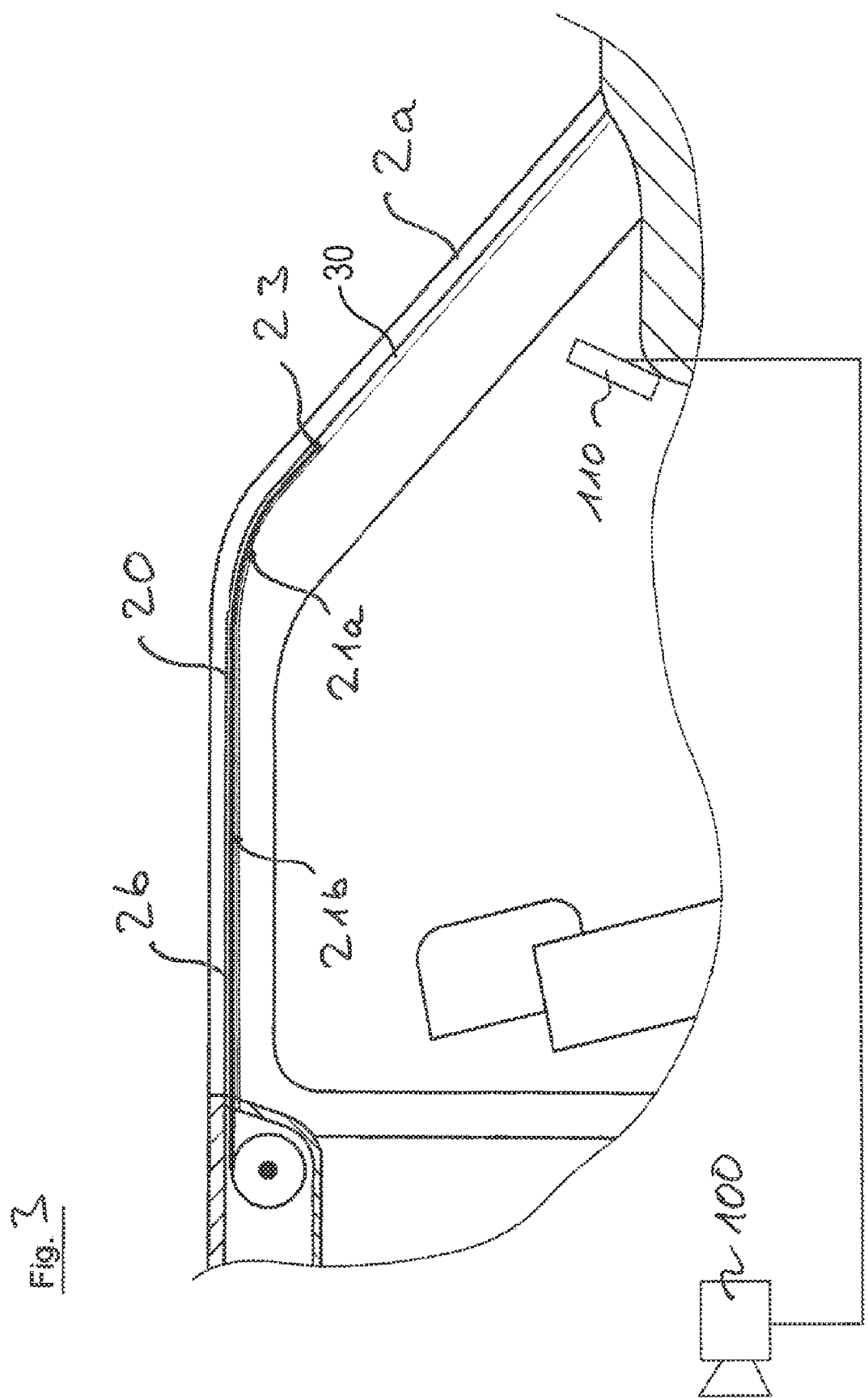
FIG. 3 the motor vehicle from FIG. 1 with a sun roller blind further pulled out into an anti-glare position.

If the sun roller blind 20 is pulled out and locked in an anti-glare position shown in FIG. 3 in which it additionally covers an upper field of vision of the windscreen region 2a the pull member 23 takes the front support member 21a coupled to it along in the guide rails 30 until it strikes impact blocks (not shown) and its continued onward movement is prevented by these, so that the permanent magnet pairs are released and the decoupled support member 21a remains in the region of the panorama screen 2 in order to tauten the sun roller blind 20 against the panorama screen 2.

Figure 4:
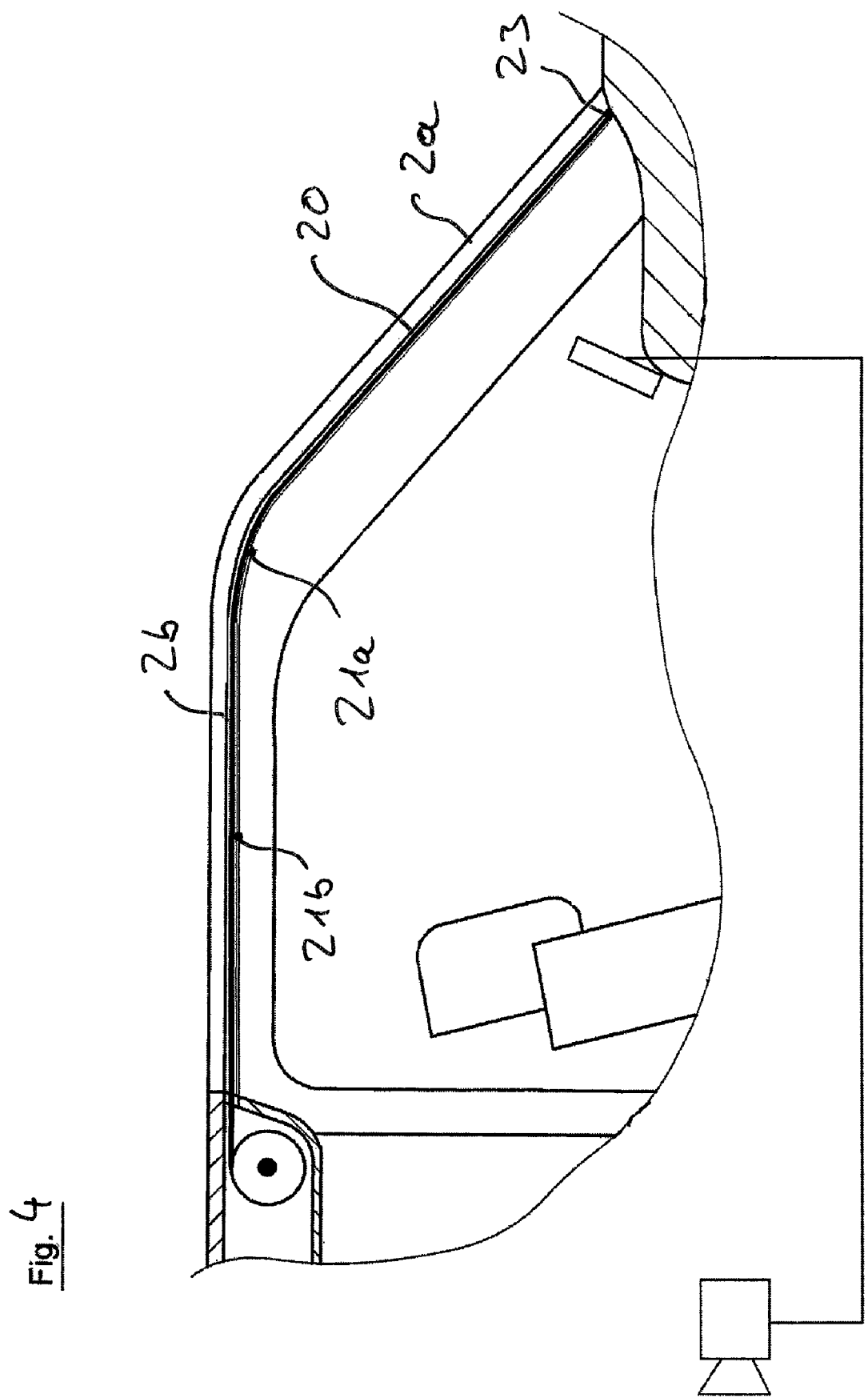
FIG. 4 the motor vehicle from FIG. 1 with sun roller blind completely pulled out into a shading position.

The sun roller blind 20 can be additionally pulled out and locked in a shading position shown in FIG. 4, in which it shades the interior space of the parked vehicle. Locking, even in intermediate positions, which are not shown, in which for example the roof region 2b is only partially covered, can for example be effected through clamping, engaging or fixing of a motor drive.

If conversely the pull member 23 is moved back into the anti-glare position (FIG. 3) the roof covering position (FIG. 2) or the basic position pushed in behind the roof headlining cover 11 (FIG. 4→FIG. 3→FIG. 2→FIG. 1), the pull member 23 takes the support members 21a, 21b along subject to the closing of the permanent magnet pairs or the hook connections so that these do not impair the field of vision of the panorama screen 2 and the roof screen 3.

In an alternative embodiment one or both support members 21a, 21b are not coupled to the pull member 23, but adjustable in a separate rail manually or motorically independently of the pull member 23 in order to for example be moved into optimal automatically predetermined support positions. For example, such support positions can be located in the region of the middle of the roof region 2b (see FIG. 2) or the transition region (see FIG. 3, 4) and optimally support the sun roller blind 20 there.

In a manner which is not shown in more detail the front support member 21a is designed variable in its length (perpendicularly to the drawing plane of FIGS. 1 to 4), for example in two parts, wherein the one part partially engages over the other part for example quill-like and is elastically coupled with said other part, for example via an interior spring. When pulled down in the lateral guide rails 30 which, because of a trapezium shape of the windscreen region 2a do not run parallel, the two-piece support member 21a guided in these rails lengthens under the tension of its interior spring and can thus be pushed also into regions of different guide rail spacings. When pushed in, the support member 21a is again pulled back to its original length by the interior spring.

Since the sun roller blind 20 is designed continuously from the one to the other vehicle side, an interior rear view mirror in the transition region would be in the way of the sun roller blind pulled out into the anti-glare position (FIG. 3) or beyond. For this reason, said mirror is replaced with a monitor 110 in the instrument panel of the motor vehicle 1 and a camera 100 connected to said monitor, which camera is arranged at the highest point of the vehicle rear and capable of being swiveled horizontally and/or vertically. This camera can additionally serve as reverse parking aid and to this end be activated on engaging of the reverse gear. If it is utilized in place of the interior rear-view mirror and to this end is activated for example by the driver by means of a button on the steering wheel, it can substantially capture the entire rear space behind the motor vehicle 1, so that blind spot regions are reduced or avoided. Following a predetermined time the camera can switch itself off again so that on the monitor other information for example of a navigation system can be displayed in place of the camera image.

The support positions of the two support members 21a, 21b predetermined by the pull-out length of the cable controls and the impact blocks are so selected that the sun roller blind 20 on the one hand is supported in the middle in the roof region 2b, in which it runs horizontally, in order to reduce sagging under its own weight, and on the other hand is supported in the transition region to the windscreen region 2a so that it can be tautened between the support member 21a and the locked pull member 23. If not required, the support members 21a, 21 do not interfere with the field of vision of the transition and roof region either.

If in the alternative embodiment the support members automatically move into predetermined optimal support positions motorically, these can for example depend on the pulled-out length of the sun roller blind, i.e. its length between pull member 23 and roof headlining cover 11, for example equidistant to a division which is obtained from the pull-out length divided by the number of support members increased by one. In other words, if two support members 21a, 21b are present as in the exemplary embodiment shown, these can be moved to ⅓=1/[2(=number of support members)+1] or ⅔ of the pulled-out length of the sun roller blind 20, optimally supporting said sun roller blind there.

In order to prevent inadvertent pulling closed of the sun roller blind 20 beyond the anti-glare position (see FIG. 3) while travelling, an electrically, mechanically, pneumatically or hydraulically switchable latch or stop is located in the guide rail 30, which with switched-on ignition limits the roller blind travel. Alternatively, a mechanism in the pull member 23 in conjunction with the guide rails can ensure this function.

If the roller blind is motorically brought into position through at least one drive motor, for example with the help of pull cable, push cable, gear or similar by means of a guide rail which runs horizontally along the roof region 2b and parallel along the windscreen region 2a, wherein a moveable slide in the guide rails 30 can serve as connection between the drive and the roller blind, the roller blind can likewise be secured against inadvertent pulling closed while travelling. This in turn can be effected via mechanical, electromechanical, pneumatic or hydraulic latches or stops in the guide rails 30 with switched-on ignition and/or by means of a switch, inductive sensor, Hall sensor, optical sensor which determines the position of the slide so that the travel of the roller blind is limited or stopped via a control unit of the drive.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle comprising:
    a panorama screen comprising a windscreen and a roof screen unitarily connected to the windscreen; and
    a roller blind assembly for the panorama screen, the roller blind assembly comprising:
        a continuous and unitary pull-out roller blind;
        a pull member coupled to the pull-out roller blind;
        a rear support member for the pull-out roller blind, the rear support member adapted to be coupled to and decoupled from the pull-out roller blind in response to movement of the pull-out roller blind; and
        a front support member for the pull-out roller blind, the front support member adapted to be coupled to and decoupled from the pull-out roller blind in response to movement of the pull-out roller blind;
    wherein movement of the pull-out roller blind from a completely wound position to a roof covering position covering the roof screen is associated with movement of the rear support member toward the windscreen and to a predetermined position where the rear support member is decoupled from the pull-out roller blind and where further movement of the rear support member is prevented, and is further associated with movement of the front support member and the pull member toward the windscreen;
    wherein movement of the pull-out roller blind, from the roof covering position to an anti-glare position covering the roof screen and covering an upper field of vision of the windscreen, is associated with movement of the front support member toward the windscreen and to a region of the panorama screen where the front support member is decoupled from the pull-out roller blind and where continued onward movement of the front support member is prevented, and is further associated with movement of the pull member toward the windscreen; and
    wherein movement of the pull-out roller blind, from the anti-glare position to a shading position covering the roof screen and the windscreen, is associated with movement of the pull member past the windscreen.

2. The motor vehicle according to claim 1, wherein the pull-out roller blind is a sun roller blind.

3. The motor vehicle according to claim 1, wherein the pull-out roller blind is adapted to lock in the roof covering position.

4. The motor vehicle according to claim 1, wherein the pull-out roller blind is adapted to lock in the anti-glare position.

5. The motor vehicle according to claim 1, further comprising a roller blind cylinder that is located near a B-pillar of the motor vehicle.

6. The motor vehicle according to claim 5, wherein the roller blind cylinder is arranged accommodated in a roof headlining cover.

7. The motor vehicle according to claim 1, wherein the pull-out roller blind extends at least over an entire width of the panorama screen.

8. The motor vehicle according to claim 1, further comprising guide rails adapted to guide the front support member and the rear support member.

9. The motor vehicle according to claim 1, wherein the pull-out roller blind has a predetermined opacity of at least 25% opacity.

10. The motor vehicle according to claim 1, wherein the pull-out roller blind has a predetermined opacity of at least 50% opacity.

11. The motor vehicle according to claim 1, wherein the pull-out roller blind has a predetermined opacity of substantially 100% opacity.

12. The motor vehicle according to claim 1, wherein a position of the front support member relative to the panorama screen is independently adjustable of the pull-out roller blind, and wherein a position of the rear support member relative to the panorama screen is independently adjustable of the pull-out roller blind.

13. The motor vehicle according to claim 1, wherein each of the front support member and the rear support member comprises a plastic.

14. The motor vehicle according to claim 1, wherein each of the front support member and the rear support member comprises a fiber composite.

15. The motor vehicle according to claim 1, wherein each of the front support member and the rear support member comprises a metal.

16. The motor vehicle according to claim 1, wherein a length of the front support member is variable in a vehicle transverse direction, and wherein a length of the rear support member is variable in the vehicle transverse direction.

17. The motor vehicle according to claim 1, wherein the pull-out roller blind is flexible.

18. The motor vehicle according to claim 1, further comprising a visual system with a camera and a monitor that are adapted to display an image of a rear space behind the motor vehicle captured by the camera.

* * * * *